Dec. 28, 1965    G. B. FARKAS ET AL    3,225,955
LAND STORAGE FOR LIQUEFIED GASES
Filed Sept. 27, 1963    2 Sheets-Sheet 1

INVENTORS.
George B. Farkas
Andrew D. Korin
by Nathaniel Ely
ATTORNEY.

INVENTORS.
George B. Farkas
Andrew D. Korin by

ATTORNEY.

United States Patent Office 3,225,955
Patented Dec. 28, 1965

3,225,955
LAND STORAGE FOR LIQUEFIED GASES
George B. Farkas, Jackson Heights, N.Y., and Andrew D. Korin, Oakland, N.J., assignors to Hydrocarbon Research, Inc., New York, N.Y., a corporation of New Jersey
Filed Sept. 27, 1963, Ser. No. 313,142
4 Claims. (Cl. 220—9)

This application is a continuation-in-part of Serial No. 83,076, filed January 16, 1961, and now abandoned.

This invention relates to improvements in a storage tank for storing liquids under cryogenic conditions at temperatures as low as −424° F., and more particularly to a land based storage tank for storing liquid methane (liquefied natural gas) and similar liquefied gaseous materials at temperatures below about −40° F. so that they can be stored at substantially atmospheric pressure.

The mechanical design of suitable tanks for storage of liquefied gases has proved to be extremely difficult due to the necessity of assuring adequate strength, maximum use of the metal, simplified construction and especially to provide a tank which has a relatively low heat infiltration. It has been especially difficult to supply suitable insulation that will withstand the extremely low temperatures and variations in size resulting from expansions and contractions of the tankage and provide access for inspection, cleaning or repair.

The present invention is primarily adapted to the economical storage of liquefield gases at cryogenic conditions of below −40° F. and approximately atmospheric pressure and is particularly adapted to have a low heat infiltration, be of relatively low unit cost, and have a high factor of safety.

The invention also has the specific advantage of the use of a monolithic construction of insulation so that the heat infiltration will be reduced and yet the structure will permit access to the space between the inner and outer walls for the purpose of inspection and possible repair.

A further feature of the invention is the provision of an improved light weight insulated floating cover for the liquid containing tank, such cover being adapted to have a limited movement due to contraction and expansion changes but being preloaded to withstand the effect of a small gas pressure above the stored liquid.

A further object of the invention is the provision in a double wall land tankage of structural supports for the roof of the outside tank which supports are directly carried by the cover over the inner liquid carrying tank and which in turn extend to the foundation of the tank so as to be independent of the wall supports of the tankage and thus permit larger diameter tankage with lower proportionate material costs.

Other objects and advantages of the invention will appear from the following description of a preferred form of embodiment thereof taken in connection with the attached drawings in which.

Figure 2:
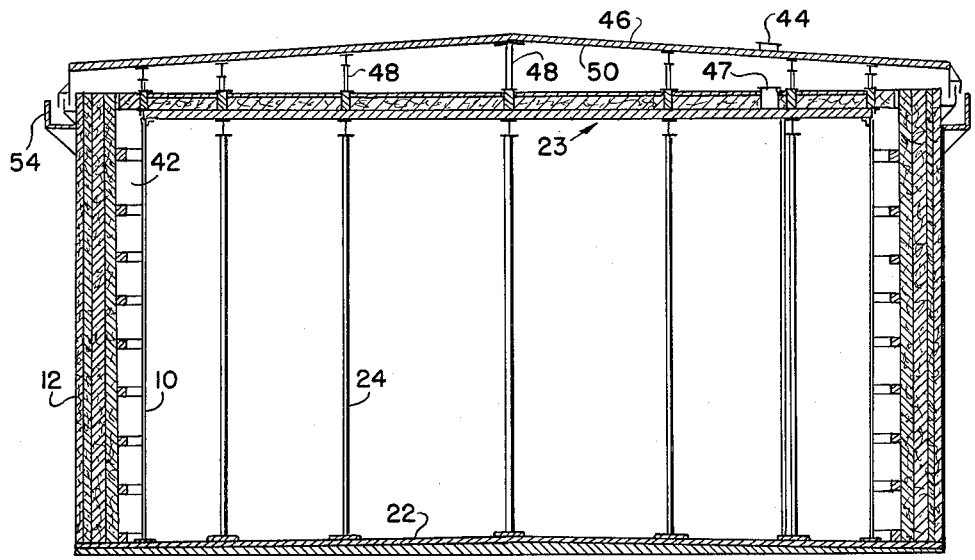
FIGURE 2 is a substantially central vertical cross section through the tank.
Figure 4:
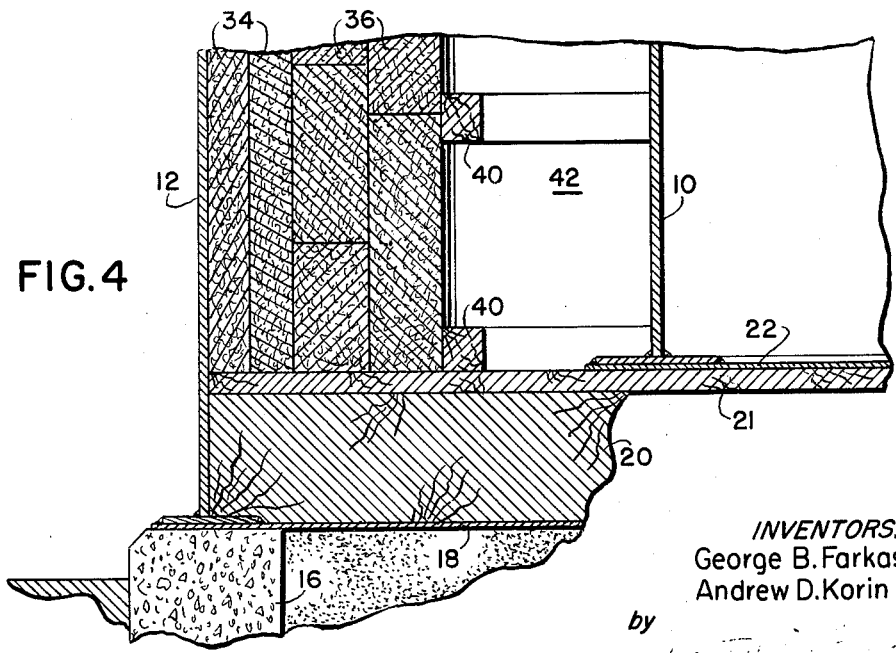
FIGURE 4 is an enlarged vertical cross section of a part of the lower bottom and side construction of the tank shown in FIGURE 2.

As more particularly shown in FIGURE 2, the liquefied gaseous storage tankage includes the inner shell or main tank 10, and the outer shell or safety and shielding and insulating tank 12, both of which are supported from a foundation generally indicated at 16 as shown in FIGURE 4.

Conveniently, the outer shell 12, which is preferably of carbon steel, is built as shown in detail in FIGURE 4 on a base 18 which in turn is carried by the foundation supports 16. Conveniently, the wall of this outer shell 12 may be only partially completed as to height and after the portion is tested for leakage, the base insulation 20 such as balsa wood, foam glass or similar material is laid on the bottom 18. Balsa wood not only has adequate strength to support planking 21 on which the inner tank 10 rests, but it also has the advantage of preventing any circulation of gas currents that would tend to increase heat infiltration.

The side wall of the inner tank 10 is conveniently welded to the floor 22 which floor in turn rests on the planking 21. Preferably the side wall and floor of this inner tank are of aluminum which withstands the necessary low temperature and serves as a highly satisfactory material for the purpose. The inner tank 10 is completed by a cover 23 supported by aluminum columns 24 from the floor 22.

Figure 3:
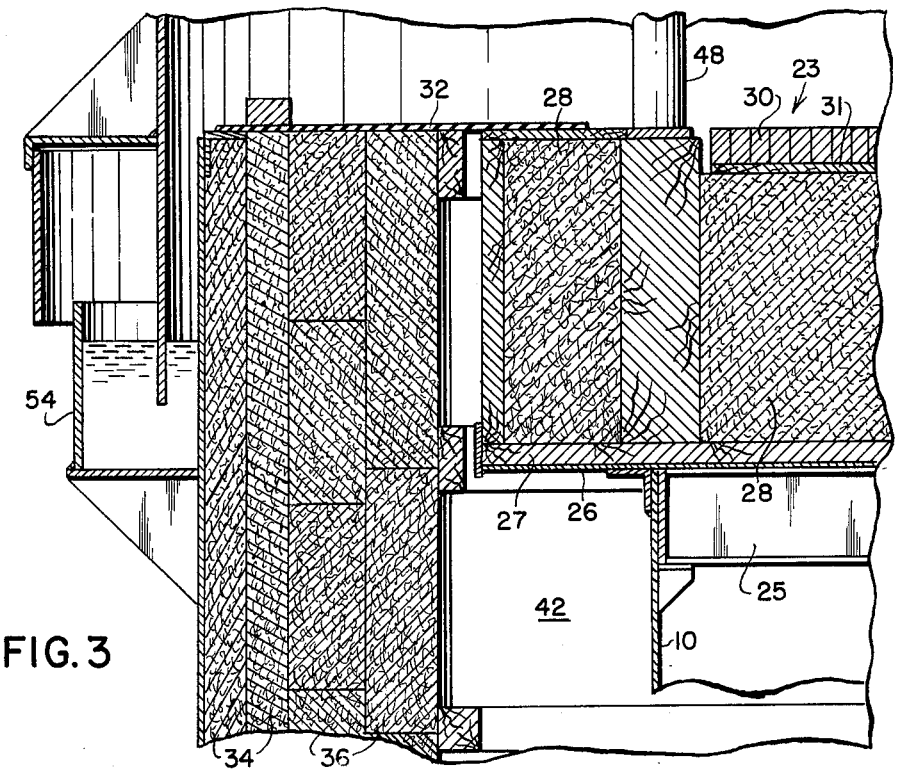
FIGURE 3 is an enlarged vertical cross section taken at an upper corner of the tank shown in FIGURE 2.

As shown in FIGURE 3, this inner cover 23 is a composite structure mounted on suitable girders 25 and including an aluminum sealing plate 26 which is preferably seal welded to the wall 10, suitable wood planking is then laid on plate 26 and in turn supports the insulation layer 28 which is preferably rockwool. This insulation layer is then covered as by a planking 31.

The inner tank 10 is adapted to maintain a gas pressure at the top of the liquid and to overcome any tendency of the large surface to move, we find it desirable to preload the cover with a uniform loading in the range of 10 to 750 lbs./sq. ft. A preferred manner of doing this is to use common brick 30 which may be cheaply and easily used. It will be noted that the cover is supported primarily by the internal columns 24 and this loading does not represent any excessive stress.

It will be appreciated that this loading is in addition to the normal weight of the cover itself. It is thus possible to build up a desired pressure in the order of one half to five pounds per square inch, or even greater, to assure pressure evacuation of gases without excessive bulge or pressure on the cover, and without otherwise essential re-enforcement of the cover.

The outer tank, after being completed, is insulated by insulation specifically adapted to the very low temperature conditions and the desire to use material that can be retained in place during the usual operating period but removable if inspection or repair is required. The selection of insulation and its arrangement have been found to account for a very substantial cost of the tankage and their proper choice also determines to a large extent the extent of heat infiltration.

In accordance with our invention, we prefer to use at least two layers of insulation as generally indicated at 34 and 36. The first of these layers 34 may be of a double layer of four inch blocks of foam glass or cork or other pre-curved and shaped insulation. This can then be mounted in permanent array as by the use of suitable binders against the hotter wall, which is the outer wall, usually carbon steel wall 12 of the tankage.

While such insulation is normally quite expensive per cubic foot, it proves to be most economical for its duty due to its cellular structure which prevents gas circulation and resulting cold spots on the tank wall. It is, of course, to be understood that the thickness of this layer is based on the desired heat infiltration and the temperatures to be considered. The use of eight inches of this material as set forth is particularly suited for protection against heat infiltration to a level from atmospheric to about $-200°$ F.

We also find it to be particularly desirable to next line the fixed insulation blocks 34 with a row or rows of a semi-fixed granular or fibrous secondary insulation such as rockwool which can be packed conveniently in bags 36 of eight inches or greater width. The bags themselves are preferably of impervious material which serves to decrease gas currents. These bags are conveniently held in place by cribbing 40.

The insulation is thus installed in a manner to effectively meet the exacting requirements of the very low temperature storage conditions regardless of the ambient temperature. The fibrous or granular semi-fixed or secondary insulation prevents any substantial heat infiltration to the liquid carrying tank 10 and the cellular primary insulation prevents any possible cold spots on the outer tank 12.

It is important that this secondary insulation not interfere with the wall 10 of the inner tank in any manner that would tend to put undesired pressure on the wall, or possibly cause rupture. It will be understood that with large tanks passing through very large temperature changes, as for example at times of inspection, there would be such expansion of the wall of the inner tank as to cause damage if there is material such as pulverulent insulation in the way.

By using the layers of insulating material against the outer tank we leave an access space generally indicated at 42 between the inner surface of the insulation and the outer surface of the wall of the inner shell. This access space not only permits inspection and repair by personnel during maintenance but the air space becomes an important insulator which further tends to prevent heat transfer to the cold wall of the inner tank.

Access to this space 42 between the inner and outer tank walls is by access door 44 in the roof 46 and by removal of sufficient bags 36 of insulation at the top as shown in FIGURE 3. Hatchway 47 through the cover 23 permits inspection of the inner tank 12. It is thus possible to have complete inspection of both sides of the inner tank with a minimum of space lost to liquid storage.

A gas seal 32, held in place by suitable retainers, seals the cover 23 with respect to the side walls 12 of the outer tank and tends to prevent any circulation of gas between the inner tank wall 10 and the outer tank wall 12.

The carbon steel outer shell 12 is not only adapted to protect the inner aluminum tank and to provide adequate support for the insulation but it has also a very substantial advantage of safety in that if any rupture should take place in the aluminum tank the carbon steel tank will at least temporarily hold all of the liquid contents and thus act as a dike.

The roof 46 for the outer tank 12 is suitably pitched to provide water runoff and is supported by columns 48 which are suitably placed over the columns 24. The roof 46 is thus directly supported by the aluminum floor 22, and thus the foundation 16.

Figures 1, 1A:
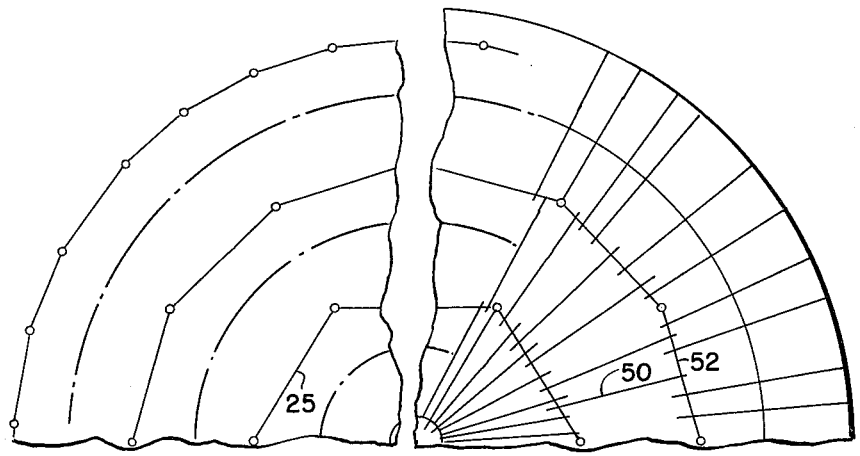
FIGURE 1 and 1a are partial plan views of the skeleton supporting construction for the cover and the roof respectively.

As shown in FIGURE 1, the cover includes various girders 25. In FIGURE 1a, the roof 46 is shown as formed from a series of radial girders 50 which are tied together with rafters 52. Conveniently, the roof 46 is provided with the usual gas tight liquid seal 54 surrounding the edge as is common with floating cover constructions.

The tank as hereinbefore described may be of the order of 100 feet or more in diameter, and of the order of 50 feet or more in height. While such a construction does not use the mathematical minimum square footage of metal, it is found that it permits the use of the most economical thickness of metal particularly as the aluminum wall of the inner tank is critical in the load it will support. If, for example, the tank had approximately the same height as diameter and the roof were supported from the wall it is necessary to increase the thickness of the side wall of the inner tank thus increasing the roof cost by 25% which becomes an item of substantial expense in the total cost of the installation. By the use of suitably spaced columns 24 there is no limitation to the diameter of the tank and a diameter of 100 feet or more can be made without any material increase in the cost of beams for the cover or roof and with some decrease in total cost.

No details of piping for fill and discharge are shown as these are conventional.

While we have shown and described a preferred form of embodiment of our invention, it will be apparent that modifications may be made thereto which are within the scope and spirit of our invention and are comprehended within the limits of the claims appended hereinafter.

We claim:

1. Land storage tankage for the storage of liquefied gases at temperatures below about $-40°$ F. and at substantially atmospheric pressure which comprises an external tank adapted to be supported on a ground mounted foundation, said external tank including a base and a wall extending upwardly therefrom, a layer of insulation on said base, a layer of insulation mounted against the internal face of said wall, and an internal tank adapted to receive liquefied gases, said internal tank including a base and a wall extending upwardly from said base, said base of said internal tank being supported from the base of said external tank and being spaced therefrom by the layer of insulation thereon, the insulation mounted against the inner face of the wall of the external tank being spaced from the wall of said inner tank a sufficient distance for personal inspection of the wall of the inner tank and the insulation, a substantially flat cover for said inner tank, insulation on said cover, columnar means to support said cover from the base of said inner tank, a roof for said external tank spaced from said cover, means to support said roof from said cover, and means to seal said roof with respect to the wall of the external tank.

2. Land storage tankage as claimed in claim 1 having a flexible gas tight seal between the cover of the internal tank and the upper part of the wall of the external tank to permit movement of the cover of the internal tank with respect to the external tank and tending to prevent any circulation of gas between the inner tank wall and the outer tank wall.

3. Land storage tankage as claimed in claim 1 having counterweights on the internal tank cover corresponding to a preloading of 10 to 750 pounds per square foot to permit a pressure build-up within the tank sufficient to discharge vapors released from the liquid.

4. A heat insulated tank assembly for storing liquefied gas at temperatures below $-40°$ F. comprising an inner tank and an outer tank, the outer tank having a foundation mounted base and a side wall extending above said base, insulation on the base of said outer tank and on the internal face of said side wall of said outer tank, the internal tank having a base supported from the base of the outer tank and having a free standing uninsulated wall, said internal tank having a relatively flat cover, columns supporting said cover from the base of said internal tank, said outer tank having a roof, means to directly support said roof from said internal tank cover, a flexible seal between the periphery of the cover and the wall of the outer tank, means to seal the roof with respect to the side wall of the outer tank, said roof having an access opening to permit personal access to and inspection of the insulation on the external tank and the external area of the internal tank.

References Cited by the Examiner
UNITED STATES PATENTS

| | | | |
|---|---|---|---|
| 116,423 | 6/1871 | Forstall. | |
| 1,716,950 | 6/1929 | Day | 220—85 |
| 1,761,697 | 6/1930 | Williams | 220—81 |
| 2,323,297 | 7/1943 | Collins. | |
| 2,327,084 | 8/1943 | Wiggins | 220—85 |
| 2,563,118 | 8/1951 | Jackson | 220—15 |
| 2,896,416 | 7/1952 | Henry | 220—15 X |
| 3,081,916 | 1/1962 | Henry | 220—15 |
| 3,094,963 | 6/1963 | Corlett | 220—15 X |
| 3,110,157 | 11/1963 | Radd | 220—14 X |

THERON E. CONDON, *Primary Examiner.*